UNITED STATES PATENT OFFICE.

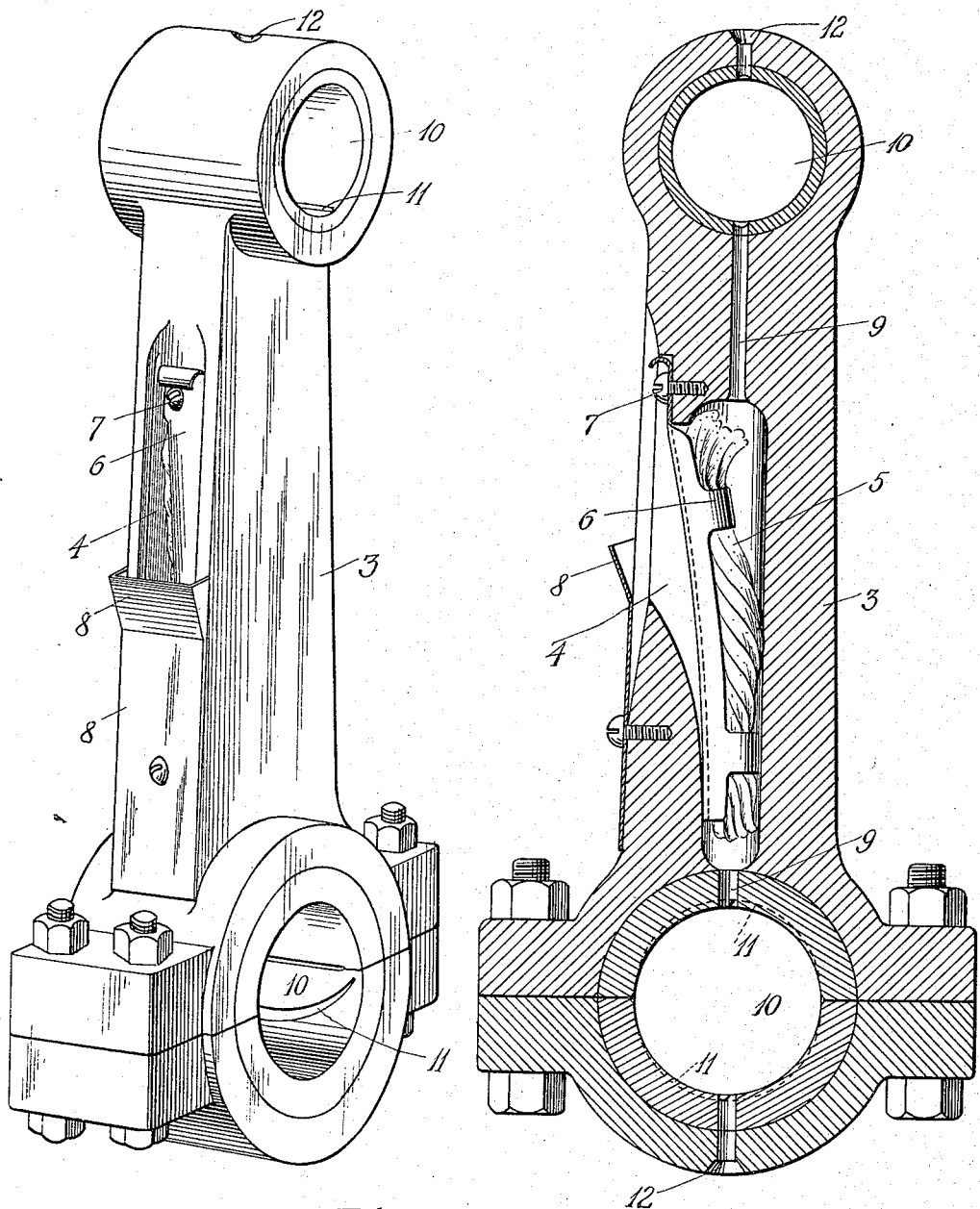

GUSTAV RAPSCH, OF ROCKVILLE CENTER, NEW YORK.

EMERGENCY LUBRICATING DEVICE.

1,147,266.  Specification of Letters Patent.  Patented July 20, 1915.

Application filed February 1, 1915.  Serial No. 5,476.

*To all whom it may concern:*

Be it known that I, GUSTAV RAPSCH, a citizen of the United States, residing at Rockville Center, in the county of Nassau and State of New York, have invented new and useful Improvements in Emergency Lubricating Devices, of which the following is a specification.

This invention relates to an emergency lubricating device and has as its principal object to provide machine parts subject to friction, with a lubricant in cases of emergency when the regular lubrication device does not operate.

A further object of my invention is to provide such a device which is simple in construction and cheap of manufacture.

With the foregoing and other objects in view, my invention consists in the particular construction, combination and arrangement hereinafter more specifically described and illustrated in the accompanying drawing which shows one preferred form of the embodiment of my invention and in which:

Figure 1 is a perspective view of a connecting rod provided with my device and Fig. 2 is a vertical section of the same, showing some parts of my device in side elevation.

The same reference characters refer to the same parts in the separate views.

Referring more particularly to the drawing, 3 is the body of a connecting rod in which a recess 4 has been formed to accommodate therein a wick 5 within a holder 6 removably attached to the body of the connecting rod 3 by means of a screw 7. A sort of hopper 8 is also attached to the body of the connecting rod 3 in front of the recess 4. Channels 9 connect the recess 4 with the inside of the journal-boxes 10, where grooves 11 are formed traversing the inner surface thereof. Further channels 12 lead from the inside of the journal-boxes 10 to the outside of the connecting rod. This form of my invention is especially intended for automobile engines where the connecting rods run continually in an oil-bath and the splashing lubricant will automatically be fed into the recess 4 through the hopper 8. The wick 5 would thus be soaked with lubricant which would drip through the channels 9 into the journal-boxes 10, and distributed over the whole inner surface thereof by the grooves 11. The superfluous quantity would then leave through the channels 12. Now, the role of this emergency lubricating device would begin when the oil-bath in the engine space is allowed to run too low or when, for instance in the cases of a sharp turn of the automobile, the whole quantity of the lubricant in the engine space is thrown over to one side and the connecting rods on the other side of the engine space remain without lubrification, sometimes for a considerable period. In such cases the oil contained in the wick 5 would be sufficient for lubricating the journal-boxes until the return to normal circumstances and thus prevent serious disasters that might otherwise occur owing to the lack of lubrication.

Of course, my emergency lubricating device may be used in other parts of engines, pumps, etc., likewise and the form thereof just described and illustrated in the drawing is only one instance of its usefulness.

It is also understood that while I have thus described and shown one preferred form of my invention I do not want to be limited to its mechanical details and may resort to such alterations and modifications as come within the scope of the claims hereunto appended.

I claim:

A connecting rod having a recess formed in its body, a wick supported by a holder attached to said body, within said recess, communicating channels between said recess and the inside of the journal-boxes of said connecting rod, oil grooves formed in the inner surface of said journal-boxes and exit-ports leading from the inside of said journal-boxes to the outside of the heads of said connecting rods, substantially as and for the purpose set forth.

GUSTAV RAPSCH.

Witnesses:
A. BROMBERG,
CLADAR HAMBURGER.

Copies of this patent may be obtained for five cents each, by addressing the "Commissioner of Patents, Washington, D. C."